INVENTOR.
FRANK HAWKINS

INVENTOR.
FRANK HAWKINS
BY Young and Quigg
ATTORNEYS

United States Patent Office 3,245,590
Patented Apr. 12, 1966

3,245,590
FEEDER DEVICE
Frank Hawkins, Houston, Tex., assignor to Phillips
Petroleum Company, a corporation of Delaware
Filed Dec. 13, 1963, Ser. No. 330,431
6 Claims. (Cl. 222—368)

This invention relates to a feeder device. In one aspect this invention relates to feeding or transferring granular material from one operating zone to another operating zone. In another aspect this invention relates to the feeding or transfer of granular materials between operating zones operated at different pressures.

Numerous processes require the transfer of granular or other type materials from one zone of operation in the process to another zone of operation. Frequently these different zones of operation are operated at different pressures and conventional conveyor or other transfer equipment is not adequate to effect the transfer without loss of pressure from one or both of said zones. In other instances, the material being transferred must be transferred by means of or in the presence of a protective environment such as an inert gas to protect said material from oxidation or other deterioration. For example, in some types of catalytic cracking processes for the refining of petroleum oils a spent granular catalyst is transferred from a reaction chamber to a catalyst regeneration chamber and the regenerated catalyst is then transferred to a hopper adjacent said reaction chamber for intermediate storage. Said hopper is nearly always operated at a pressure considerably less than the pressure within the reaction chamber and the regenerated catalyst must be moved from said hopper into the reaction chamber without loss of reaction chamber pressure. As another example, in one method employed in the plastic industry for preparing pigmented plastics a concentrate of the plastic containing the desired pigment is first prepared and this concentrate is blended with plastic containing no pigment to prepare the final product. In such a process a masterbatch of the concentrate is prepared by mixing the desired pigment with molten plastic containing no pigment and the resulting melt is then extruded into pellets. Said pellets are then transferred, while still relatively hot, to storage for use when desired. In the transfer of the hot pellets it is desirable that they not be exposed to air. This requires the use of a non-oxidizing gas as the transfer medium and it is desirable that said gas be conserved.

In processes such as those described above, an apparatus is required which can move the material being transferred from zone to zone without loss of pressure and from one of said zones and/or without subjecting the material to a deteriorating atmosphere. A wide variety of such apparatus has been developed in the prior art, including various types of so-called star valves, rotary valves, etc. The big problem in all of such devices is avoiding loss of pressure and/or loss of the transporting medium. In other words, the problem is to provide an adequate seal in the feeder device or transfer mechanism. Some of the prior art devices are elaborate complex apparatus which are far too complicated and expensive for use in many processes, particularly by small scale manufacturers, and often are not satisfactory in spite of their complexity. Other devices of the prior art provide more or less elaborate means for introducing a sealing gas into the transfer mechanism.

Thus, there is a definite need in the art for a simple, inexpensive transfer or feeder mechanism which can be easily fabricated, is easy to operate, easy to maintain, and which will provide an adequate seal under the conditions in which it is employed. The present invention provides such an apparatus.

An object of this invention is to provide an improved feeder device or transfer mechanism. Another object of this invention is to provide a feeder device or transfer mechanism which is simple, inexpensive, easily fabricated, easy to operate, easy to maintain, and which will provide an adequate seal under the conditions in which it is employed. Another object of this invention is to provide for the transfer of a material, e.g., a granular material, between different operating zones of a process without loss of pressure from one or more of said zones and/or without loss of transfer medium. Other aspects, objects, and advantages of this invention will be apparent to those skilled in the art in view of this disclosure.

Thus, according to the invention, there is provided a feeder device comprising: a cylindrical rotor mounted for rotation on a substantially horizontal axis and provided with a pair of opposite spaced apart openings in the wall thereof; a casing enclosing said rotor, said casing comprising an inner cylindrical wall in close sliding contact with the outer wall of said rotor and a pair of opposite end walls; an internal partition extending across said rotor with its opposite outer ends attached to the inner wall of said rotor at points between said openings therein, said partition when in substantially horizontal position thus dividing the interior of said rotor into an upper pocket and a lower pocket, each of said pockets being defined by said partition, the inner wall of said rotor, and said end walls; an entry port provided in the upper portion of the wall of said casing; and outlet port means provided in a lower wall of said lower pocket.

Further according to the invention, there is provided a method for transferring granular material from a first zone to a second zone without appreciable change in pressure in either of said zones.

Figure 1:
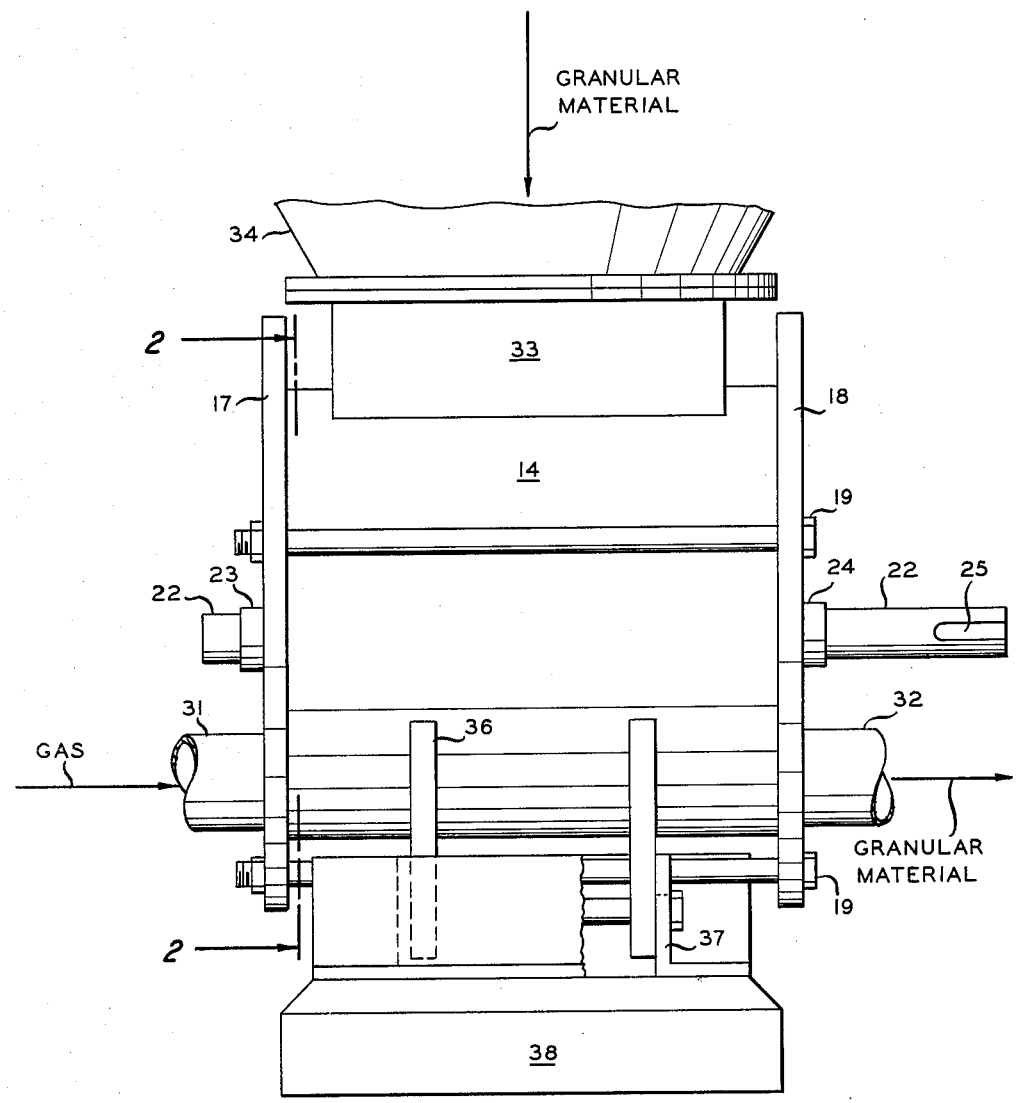
FIGURE 1 is a view in elevation of one embodiment of the invention.

Referring now to said drawings, wherein like reference numerals are employed to denote like elements, the invention will be more fully explained. Referring first to FIGURE 2, there is shown a rotor comprising a substantially horizontally disposed cylinder 10 which is provided with opposite spaced apart upper opening 11 and lower opening 12 in the wall thereof. As shown more clearly in FIGURE 3 and described further hereinafter, said openings 11 and 12 are of a size and configuration to provide substantial lands 13 and 13' between same and the respective adjacent ends of said cylinder. Said openings can be of any suitable size and configuration. The only requirement, other than the provision of said lands 13 and 13', is that the arc of the cylinder wall between said openings 11 and 12 be greater in length than the arc of the larger of said openings 11 and 12. It is usually preferred that said openings 11 and 12 be of the same size. However, it is within the scope of the invention for said openings to be of different sizes. A cylindrical casing 14 surrounds said cylinder 10 with its inner wall surface in close sliding contact with the outer wall surface of said cylinder 10. Said casing 14 is slightly longer than said cylinder 10. An entry port 16, of substantially the same size and configuration as said opening 11 in cylinder 10, is provided in the upper wall portion of said casing 14. First and second opposite end plates 17 and 18 (see FIGURE 1) are provided for closing the opposite ends of said cylindrical casing 14. Bolts 19 are provided for holding said end plates in contact with the opposite ends of said casing 14 and in close proximity to the ends of said cylinder 10. Said bolts extend through corresponding holes 21 in each of said end plates.

A rotatable shaft 22 extends concentrically through said cylinder 10 and through suitable bearing means 23 and 24 mounted in said end plates. A keyway 25 is provided in one extended end of said shaft for securing a suitable driving means such as a gear or pulley to drive said shaft. Said bearing means 23 and 24 can be any suitable type of bearing means known to the art. A hub 26 is mounted on and around said shaft for rotation therewith. Said hub can be fixed to said shaft in any suitable manner such as a press fit, a key, a pin, a set screw, etc. A first vane 27 is secured to and extends radially from said hub to a point on the inner wall of said cylinder 10 midway between said openings 11 and 12. The outer end of said vane 27 is secured to the inner wall of said cylinder 10 by any suitable means, as by welding. A second vane 28 is secured to and extends radially, in a direction opposite to that of said first vane 27, from said hub to an opposite point on said inner wall of said cylinder 10 midway between said openings 11 and 12. Said first and second vanes, when in a substantially horizontal position, together with said hub thus form a partition which divides the interior of said cylinder 10 into an upper pocket and a lower pocket. Each of said pockets is defined by said partition, the inner wall of said cylinder 10, and the inner walls of said end plates 17 and 18. An outlet port 29 is provided in the lower portion of said end plate 18. A like port, not shown, is provided in the lower portion of said end plate 17 and is axially aligned with said port 29.

Figure 2:
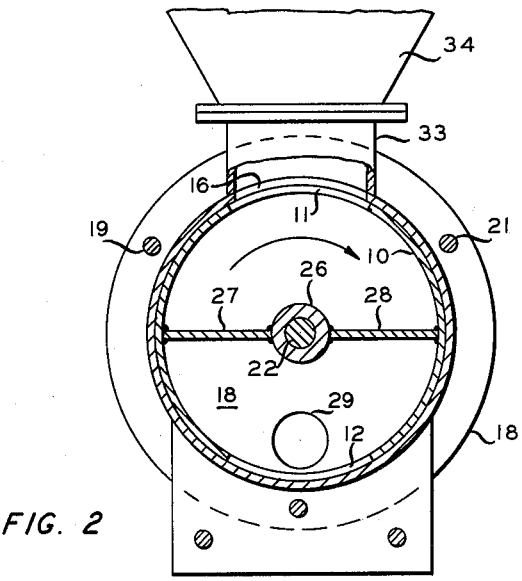
FIGURE 2 is a view, partly in cross-section, taken along the lines 2—2 of FIGURE 1.

Referring now to FIGURE 1, an inlet conduit 31 is connected into the port in end plate 17 and an outlet conduit 32 is connected into said outlet port 29 in said end plate 18. Said conduits 31 and 32 are provided for the introduction and removal of a fluid transport medium such as a suitable gas, as explained further hereinafter. A charging nozzle 33 is secured in any suitable manner to said casing 14 around the opening 16 in the upper wall thereof. Said charging nozzle 33 can be connected by means of the flange shown, or any other suitable means, to a source of granular material, such as hopper 34.

The feeder device of the invention can be supported in its operation location by any suitable means. As shown in FIGURE 1, said supporting means comprises a pair of cradle members 36 which are positioned under and extend partially around the lower portion of casing 14 in known manner. Said cradle members 36 are in turn bolted to a base 37 which comprises a suitable arrangement of angle irons as shown. Said base can rest on a suitable pedestal 38 or any other suitable support.

Figure 3:
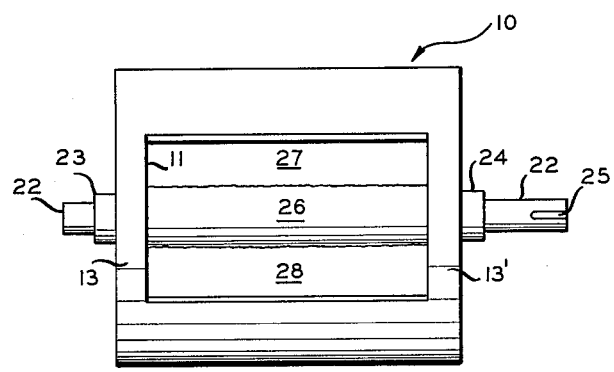
FIGURE 3 is a plan view of a portion of a feeder device in accordance with the invention.

Referring again to FIGURE 3, there is shown more clearly one of the outstanding features of the feeder device of the invention. Said FIGURE 3 is a plan view of cylinder 10 looking into opening 11 in the upper wall portion of said cylinder. It will be noted that the lands 13 and 13' at the ends of the opening 11, together with the wall portions of cylinder 10 on the sides of said opening 11 provide a continuous surface all the way around said opening 11. Said continuous surface when in close sliding contact with the inner surface of casing 14 provides a continuous seal around opening 11 at all times. It will be understood that a similar seal is provided around upper opening 11 and lower opening 12 in the apparatus described in FIGURE 4 hereinafter. Thus, in operation any gas or other material introduced through openings 11 and 16 can flow only into the upper pocket of the apparatus and can exit from said pocket only when said pocket has been rotated to the lower position as described hereinafter. Similarly, any fluid transport medium introduced into the lower pocket of the apparatus of FIGURES 1 and 2 via conduit 31 can exit from said pocket only via conduit 32.

Figure 4:
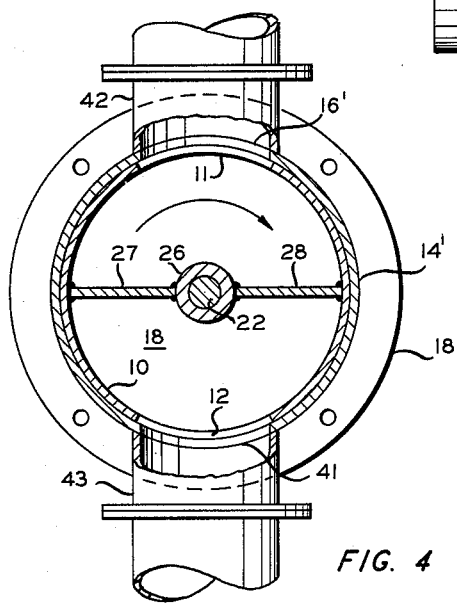
FIGURE 4 is a view, partly in cross-section, of another embodiment of the apparatus of the invention.

Referring now to FIGURE 4, there is illustrated another feeder device in accordance with the invention. Said FIGURE 4 is a view, partly in cross-section, taken through the device along a plane located similarly as the line 2—2 in FIGURE 1. In this embodiment of the invention the cylinder 10 is provided with an upper opening 11 and a lower opening 12 as in the embodiment illustrated in FIGURES 1 and 2. The cylindrical casing 14' is provided with an opening 16' in the upper wall portion, as in the previously described embodiment, and is also provided with an opening 41 in the lower wall portion. A charging nozzle 42 is secured to the upper outer wall of said cylinder 14' around said opening 16' in any suitable manner. A discharge conduit 43 is secured to the lower wall portion of said cylinder 14' around the opening 41 therein in any suitable manner. Said charging conduit 42 and said discharge conduit 43 can be connected by means of the flanges shown, or any other suitable means, into suitable supply and discharge conduits, as shown.

In the operation of the feeder device illustrated in FIGURES 1 and 2, a granular material is fed from hopper 34 through openings 16 and 11 and into the upper pocket of the device. After a suitable interval of time depending upon the size of said openings, the flow rate desired, and other processing variables, the rotor assembly comprising said cylinder 10, and said shaft 22 is rotated by any suitable means such as a motor attached to a driving gear mounted on shaft 22. When the rotor assembly has been rotated 180 degrees the lower empty pocket and the filled upper pocket change positions. During said rotation each of said pockets becomes sealed by the coaction between the outer surface of cylinder 10 (lands 13 and 13' and the wall portions between openings 11 and 12) and the inner surface of casing 14. As and when said upper pocket containing the granular material is moved into the lower position said granular material is introduced into the stream of transport medium, such as an inert gas such as nitrogen, flowing through conduits 31 and 32. Said transport medium empties the lower pocket and conveys the granular material to storage or other use by means of conduit 32. During the emptying of the lower pocket the upper pocket is filling and upon rotation again to the lower position it too will be emptied as described.

In the operation of the embodiment of the invention illustrated in FIGURE 4, the filling of the upper pocket is the same as that described above. However, when the filled upper pocket is rotated to the lower position the granular material therein falls by gravity flow through discharge conduit 43 into any suitable conduit or vessel where it is to be used, such as a reaction chamber in a catalytic cracking process. As will be understood by those skilled in the art in view of this disclosure, the flow rate through the feeder device can be controlled by the speed of rotation of the rotor assembly.

The feeder device or transfer mechanism of the invention can be fabricated in various sizes and from any suitable materials depending upon the service in which it is to be employed. As an example only, in one installation wherein a feeder device like that illustrated in FIGURES 1 and 2 was employed, the diameter of cylinder 10 was 8.5 inches. The arc provided by the openings 11 and 12 were each about 5.2 inches in length and the arcs of cylinder wall between said openings 11 and 12 were about 8.2 inches in length. As illustrated, the opening 16 in the upper wall portion of casing 14 was substantially the same size as the opening 11 in cylinder 10. The length of said cylinder 10 was about ten inches and the lands 13 and 13' at the ends of said openings 11 and 12 therein were each about one inch wide. Conduits 31 and 32 were standard two-inch pipe. The remainder of the dimensions of the apparatus were in proportion to those given.

The above dimensions are given by way of example only. Said dimensions can be varied within relatively wide ranges to provide a feeder device adapted for the intended service. However, as in almost all apparatus wherein the successful operation thereof is dependent upon interaction between various elements of the apparatus, consideration must be given to the relationships between the sizes of the various elements. For example, in the embodiment of the invention illustrated in FIGURES 1 and 2 the length of each of the arcs of solid wall portion of cylinder 10 between openings 11 and 12 must be slightly greater than the length of the arc of the larger of said openings 11 and 12 plus the distance (diameter or width) across the opening 29. In the embodiment of the invention illustrated in FIGURE 4, the length of each of the arcs of solid wall portion of cylinder 10 between the openings 11 and 12 must be large enough to cover the larger of either of the inlet or outlet openings 16' and 41. It is preferred that the lengths of the arcs of solid wall portion be appreciably greater than the length of the arc of the largest opening in cylinder 10 so as to provide maximum sealing area betwen the outer wall of said cylinder 10 and the inner wall of said casing 14. It has been found that the ratio of wall arc to opening arc of about 1:0.6 gives excellent results.

While the invention has been described with particular reference to the feeding or transferring of granular materials, it is within the scope of the invention to employ the feeder device of the invention for the transfer of liquids.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A feeder device comprising: a cylindrical rotor mounted for rotation on a substantially horizontal axis and provided with a pair of opposite spaced apart openings in the wall thereof, the arc of the wall portions of said rotor being greater in length than the length of the arc of the larger of said openings, and said openings being of a size and configuration to provide substantial lands between same and the adjacent ends of said rotor and thus provide a continuous surface seal around each of said openings at all times; a cylindrical casing of substantially the same length as and surrounding said rotor, the inner surface of said casing being in close sliding contact with the outer surface of said rotor; a pair of opposite end plates for closing the opposite ends of said casing; an internal partition extending diametrically across said rotor with its opposite outer ends attached to the inner wall of said rotor at points midway between said openings, said partition when in substantially horizontal position thus dividing the interior of said rotor into an upper pocket and a lower pocket, each of said pockets being defined by said partition, the inner wall of said rotor, and the inner walls of said end plates; an entry port provided in the upper portion of the wall of said casing; and outlet port means provided in a lower wall of said lower pocket.

2. A feeder device comprising: a cylindrical rotor mounted for rotation on a substantially horizontal axis and provided with a pair of opposite spaced apart openings in the wall thereof, the arc of the wall portions of said rotor being greater in length than the length of the arc of the larger of said openings, and said openings being of a size and configuration to provide substantial lands between same and the adjacent ends of said rotor and thus provide a continuous surface seal around each of said openings at all times; an internal partition extending diametrically across said rotor with its opposite outer ends attached to the inner wall of said rotor at points midway between said openings; a cylindrical casing of substantially the same length as and surrounding said rotor, the inner surface of said casing being in close sliding contact with the outer surface of said rotor; a pair of opposite end plates for closing the opposite ends of said casing; an entry port provided in the upper portion of the wall of said casing; and an opening provided in the lower portion of each of said end plates, said last mentioned openings being aligned with each other.

3. A feeder device comprising: a cylindrical rotor mounted for rotation on a substantially horizontal axis and provided with a pair of opposite spaced apart openings in the wall thereof, the arc of the wall portions of said rotor being greater in length than the length of the arc of the larger of said openings, and said openings being of a size and configuration to provide substantial lands between same and the adjacent ends of said rotor and thus provide a continuous surface seal around each of said openings at all times; an internal partition extending diametrically across said rotor with its opposite outer ends attached to the inner wall of said rotor at points midway between said openings; a cylindrical casing of substantially the same length as and surrounding said rotor, the inner surface of said casing being in close sliding contact with the outer surface of said rotor; a pair of opposite end plates for closing the opposite ends of said casing; an entry port provided in the upper portion of the wall of said casing; and an outlet port provided in the lower portion of the wall of said casing.

4. A feeder device for granular material, comprising: a substantially horizontally disposed cylinder provided with a pair of opposite spaced apart openings in the wall thereof, the arc of the wall portions of said cylinder being greater in length than the length of the arc of said openings, and said openings being of a size and configuration to provide substantial lands between same and the adjacent ends of said cylinder and thus provide a continuous surface seal around each of said openings at all times; a cylindrical casing surrounding said cylinder, the inner wall surface of said casing being in close sliding contact with the outer wall surface of said cylinder; an entry port provided in the upper wall portion of said casing, said entry port being of substantially the same size and configuration as said openings in the wall of said cylinder; first and second opposite end plates for closing the opposite ends of said cylindrical casing; means for holding said end plates in contact with the opposite ends of said casing; a rotatable shaft extending concentrically through said cylinder and through bearing means mounted in each of said end plates; a hub mounted on said shaft for rotation therewith; a first vane secured to and extending radially from said hub to a point on the inner wall of said cylinder midway between said openings therein; a second vane secured to and extending radially, in a direction opposite to that of said first vane, from said hub to an opposite point on said inner wall of said cylinder midway between said openings therein, said first and second vanes when in substantially horizontal position together with said hub thus forming a partition which divides the interior of said cylinder into an upper pocket and a lower pocket with each of said pockets being defined by said partition, the inner wall of said cylinder, and the inner walls of said end plates; and outlet port means provided in a lower wall of said lower pocket.

5. A feeder device for granular material, comprising: a substantially horizontally disposed cylinder provided with a pair of opposite spaced apart openings in the wall thereof, the arc of the wall portions of said cylinder being greater in length than the length of the arc of said openings, and said openings being of a size and configuration to provide substantial lands between same and the adjacent ends of said cylinder and thus provide a continuous surface seal around each of said openings at all times; a cylindrical casing surrounding said cylinder, the inner wall surface of said casing being in close sliding contact with the outer wall surface of said cylinder; an entry port provided in the upper wall portion of said casing, said entry port being of substantially the same size and configuration as said openings in the wall of said cylinder; first and second opposite end plates for closing the opposite ends of said cylindrical casing; means for holding said end plates in contact with the opposite ends of said casing; a rotatable shaft extending concentrically through said cylinder and through bearing means mounted in each of said end plates; a hub mounted on said shaft for rotation therewith; a first vane secured to and extending radially from said hub to a point on the inner wall of said cylinder midway between said openings therein; a second vane secured to and extending radially, in a direction opposite to that of said first vane, from said hub to an opposite point on said inner wall of said cylinder midway between said openings therein, said first and second vanes when in substantially horizontal position and said hub thus forming a partition which divides the interior of said cylinder into an upper pocket and a lower pocket with each of said pockets being defined by said partition, the inner wall of said cylinder, and the inner walls of said end plates; and an opening provided in the lower portion of each of said end walls, said last mentioned openings being aligned with each other.

6. A feeder device for granular material, comprising: a substantially horizontally disposed cylinder provided with a pair of opposite spaced apart openings in the wall thereof, the arc of the wall portions of said cylinder being greater in length than the length of the arc of said openings, and said openings being of a size and configuration to provide substantial lands between same and the adjacent ends of said cylinder and thus provide a continuous surface seal around each of said openings at all times; a cylindrical casing surrounding said cylinder, the inner wall surface of said casing being in close sliding contact with the outer wall surface of said cylinder; an entry port provided in the upper wall portion of said casing, said entry port being of substantially the same size and configuration as said openings in the wall of said cylinder; first and second opposite end plates for closing the opposite ends of said cylindrical casing; means for holding said end plates in contact with the opposite ends of said casing; a rotatable shaft extending concentrically through said cylinder and through bearing means mounted in each of said end plates; a hub mounted on said shaft for rotation therewith; a first vane secured to and extending radially from said hub to a point on the inner wall of said cylinder midway between said openings therein; a second vane secured to and extending radially, in a direction opposite to that of said first vane, from said hub to an opposite point on said inner wall of said cylinder midway between said openings therein, said first and second vanes when in substantially horizontal position and said hub thus forming a partition which divides the interior of said cylinder into an upper pocket and a lower pocket with each of said pockets being defined by said partition, the inner wall of said cylinder, and the inner walls of said end plates; and an outlet port provided in the lower portion of the wall of said casing.

References Cited by the Examiner

UNITED STATES PATENTS

| | | | |
|---|---|---|---|
| 1,139,091 | 5/1915 | Weber. | |
| 2,037,694 | 4/1936 | Brown. | |
| 2,574,166 | 11/1951 | Boydstun | 222—368 X |
| 2,585,472 | 2/1952 | Kennedy | 214—17.68 |
| 2,757,049 | 7/1956 | Temple | 302—49 |
| 2,779,634 | 1/1957 | Atkinson et al. | 302—49 |
| 2,890,079 | 6/1959 | Stumpf | 302—49 |
| 2,903,302 | 9/1959 | Ross | 302—49 |
| 2,960,245 | 11/1960 | Knapp | 214—17.68 |
| 3,101,853 | 8/1963 | Long et al. | 214—17.68 |
| 3,151,784 | 10/1964 | Tailor | 214—17.68 |

RAPHAEL M. LUPO, *Primary Examiner.*